(12) United States Patent
Huang et al.

(10) Patent No.: US 10,301,785 B2
(45) Date of Patent: May 28, 2019

(54) DRIVING MECHANISM AND WARNING DEVICE USING THE SAME

(71) Applicant: HONGFUJIN PRECISION ELECTRONICS (TIANJIN) CO., LTD., Tianjin (CN)

(72) Inventors: Chi-Ming Huang, New Taipei (TW); Che-Hsun Chen, New Taipei (TW); Chuang-Wei Tseng, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 21 days.

(21) Appl. No.: 15/695,275

(22) Filed: Sep. 5, 2017

(65) Prior Publication Data
US 2019/0024332 A1    Jan. 24, 2019

(30) Foreign Application Priority Data
Jul. 18, 2017  (CN) .......................... 2017 1 0588317

(51) Int. Cl.
*E01F 9/692*    (2016.01)

(52) U.S. Cl.
CPC .................................. *E01F 9/692* (2016.02)

(58) Field of Classification Search
CPC .................................................... E01F 9/692
USPC ..... 116/63 R, 63 P, 63 T, 28 R; 40/591, 605, 40/613, 903; 404/6, 9, 12
See application file for complete search history.

(56) References Cited

U.S. PATENT DOCUMENTS

| | | | | |
|---|---|---|---|---|
| 3,933,119 A | * | 1/1976 | Hedgewick | ............ B60Q 7/005 116/63 P |
| D240,514 S | * | 7/1976 | Brudy | .......................... D10/111 |
| 4,403,565 A | * | 9/1983 | Bleiweiss | .............. B60Q 7/005 116/63 P |
| 4,543,905 A | * | 10/1985 | McKenney | ............. E01F 9/662 116/202 |
| 4,593,265 A | * | 6/1986 | McKenney | ............. E01F 9/662 280/33.998 |
| 4,613,847 A | * | 9/1986 | Scolari | ..................... B60Q 7/00 116/63 C |

(Continued)

FOREIGN PATENT DOCUMENTS

| | | |
|---|---|---|
| CN | 202226572 U | 5/2012 |
| CN | 203113234 U | 8/2013 |

(Continued)

*Primary Examiner* — Lisa M Caputo
*Assistant Examiner* — Tania Courson
(74) *Attorney, Agent, or Firm* — ScienBiziP, P.C.

(57) ABSTRACT

A warning device used for road safety includes a warning sign and a driving mechanism. The driving mechanism includes a base, a driving unit, at least one wheel, a plurality of supporting units, and a plurality of driving members. The driving unit is accommodated in the base. The at least one wheel is connected to and driven by the driving unit. The plurality of supporting units are movably connected to the base. The plurality of driving members can manipulate the supporting units. Each of the supporting units is movable between a receiving or retracted position and a supporting or extended position. For stability in placement, the device can be lifted a small distance above the road by the supporting units when these are deployed. The driving mechanism is also disclosed.

14 Claims, 6 Drawing Sheets

(56) References Cited

U.S. PATENT DOCUMENTS

| | | | | |
|---|---|---|---|---|
| 4,805,550 A * | 2/1989 | Raczkowski | ........... | B60Q 7/005 116/63 T |
| 5,041,813 A * | 8/1991 | Chang | ............... | B60Q 7/00 340/472 |
| 5,257,020 A * | 10/1993 | Morse | ............... | B60Q 7/02 340/471 |
| 5,294,138 A * | 3/1994 | Yang | ............... | G08G 1/0955 116/63 P |
| 5,775,253 A * | 7/1998 | Quan | ............... | E01F 9/688 116/63 P |
| 6,374,524 B1 * | 4/2002 | Capps | ............... | G08G 1/0955 320/115 |
| 6,496,123 B2 * | 12/2002 | Brinkman | ........... | G08G 1/0955 116/202 |
| 6,718,670 B2 * | 4/2004 | Wang | ............... | B60Q 7/005 116/63 T |
| 7,135,990 B2 * | 11/2006 | Richardson | ........... | G08G 1/0955 340/908 |
| 7,158,020 B2 * | 1/2007 | Grady, Jr. | ............... | B60Q 7/00 116/63 T |
| 7,268,701 B2 * | 9/2007 | Rohl | ............... | G08G 1/0955 116/63 P |
| 7,748,865 B2 * | 7/2010 | Horibata | ........... | B60Q 7/00 362/230 |
| 8,740,267 B1 * | 6/2014 | Wilson | ............... | B60Q 1/32 116/28 R |
| 9,242,600 B2 * | 1/2016 | Al Shalabi | ........... | B60Q 7/00 |
| D787,968 S * | 5/2017 | Wu | ............... | D10/113.4 |
| D793,890 S * | 8/2017 | Hong | ............... | D10/113.4 |
| 9,718,401 B2 * | 8/2017 | Kim | ............... | B60Q 7/00 |
| 9,878,661 B2 * | 1/2018 | Yang | ............... | B60Q 7/00 |
| 9,927,811 B1 * | 3/2018 | Tseng | ............... | G05D 1/0088 |
| 9,942,997 B2 * | 4/2018 | Yu | ............... | G02F 1/1333 |
| 2006/0055558 A1 | 3/2006 | Rohl | | |
| 2006/0181432 A1 * | 8/2006 | Monteith | ........... | B60Q 7/00 340/907 |
| 2008/0129543 A1 | 6/2008 | Lee | | |
| 2011/0067620 A1 * | 3/2011 | Li | ............... | B60Q 1/52 116/30 |
| 2013/0106619 A1 | 5/2013 | Williams | | |
| 2016/0122956 A1 * | 5/2016 | Christiansen | ........... | B60P 3/0255 180/2.2 |

FOREIGN PATENT DOCUMENTS

| | | |
|---|---|---|
| CN | 203603083 U | 5/2014 |
| CN | 102880145 B | 2/2016 |
| CN | 205408002 U | 7/2016 |
| DE | 102016015008 A1 | 6/2017 |
| WO | 2016179627 A1 | 11/2016 |
| WO | 2017013287 A1 | 1/2017 |

\* cited by examiner

DRIVING MECHANISM AND WARNING DEVICE USING THE SAME

FIELD

The subject matter herein generally relates to driving mechanisms.

BACKGROUND

Rear-end collisions can occur when advance-warning of a breakdown for example is not given by the vehicle ahead. Rear-end collisions are also caused by the poor visibility and closeness to the warning equipment of the broken-down vehicle, the vehicles following do not have sufficient time or distance to respond. As required by transportation authorities, after an accident, an advance-warning device must be used to warn the vehicles behind, at a distance of 100-250 meters. However, when a warning device is manually placed, safety of the placer can be at risk. Therefore, a warning device that can be self propelled would be beneficial.

BRIEF DESCRIPTION OF THE DRAWINGS

Implementations of the present disclosure will now be described, by way of example only, with reference to the attached figures.

DETAILED DESCRIPTION

Figure 1:
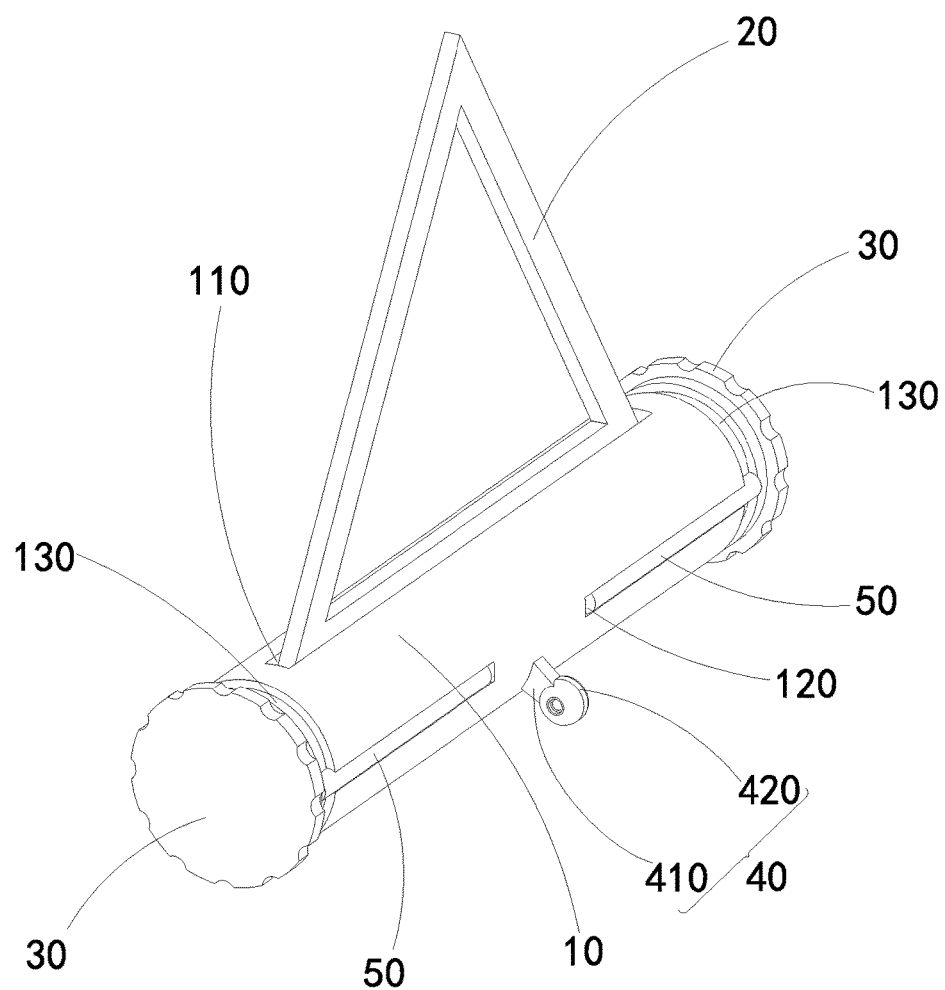
FIG. 1 is an isometric view of a first exemplary embodiment of a warning device for road safety.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Figure 2:
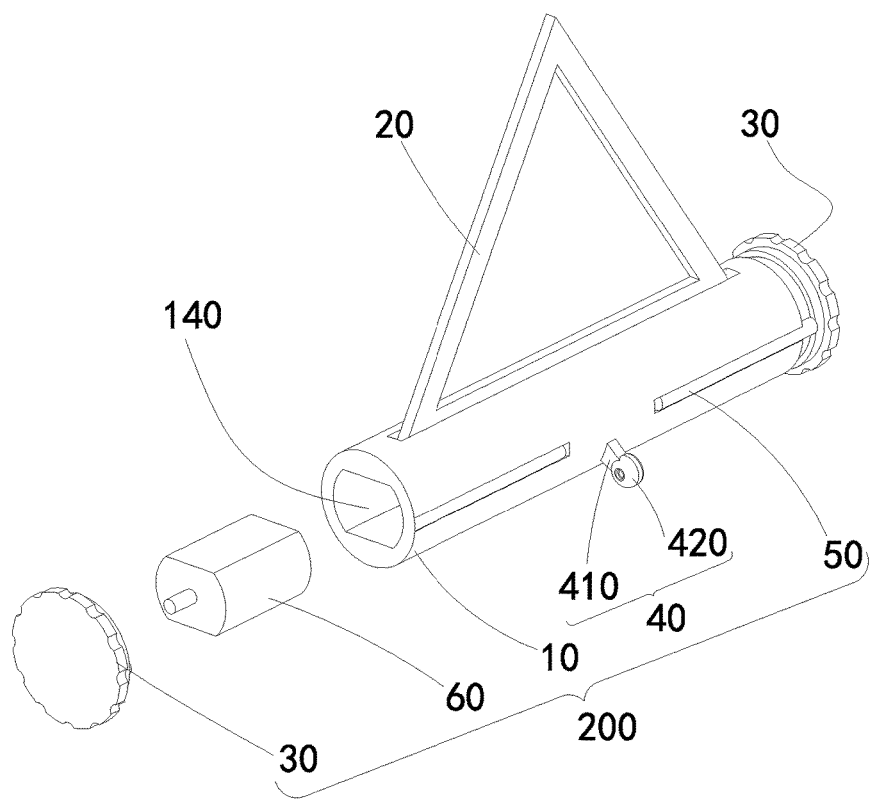
FIG. 2 is an exploded view of the warning device of FIG. 1.
Figure 3:
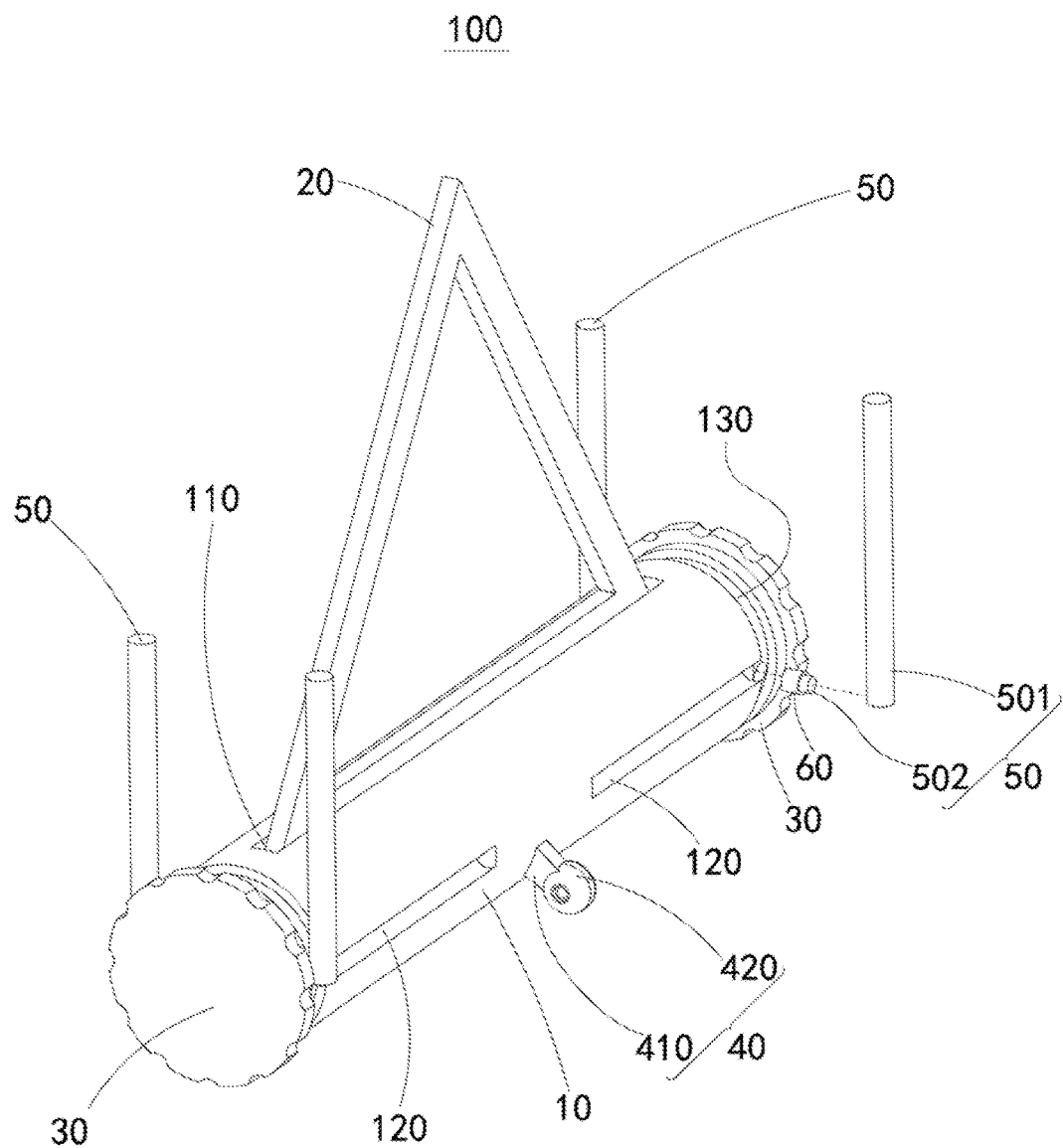
FIG. 3 is another exploded view of a mobile state of the warning device of FIG. 1.

FIGS. 1 to 3 illustrate a warning device 100 in a first exemplary embodiment.

The warning device 100 includes a warning sign 20 and a propelling mechanism 200, the warning sign 20 is installed to an upper side of the driving mechanism 200. The warning sign can be a warning triangle.

The driving mechanism can include a base 10, a driving unit 60, at least one wheel 30, a plurality of supporting units 50, and a plurality of driving members 60.

The base 10 defines an accommodating space 140, the driving unit 60 can be accommodated in the accommodating space 140.

The at least one wheel 30 can be connected to the driving unit. The at least one wheel 30 is driven by the driving unit, so that the warning device 100 can be self-propelled. For example, the driving unit 60 can be a motor, the driving mechanism can include two wheels 30 connected to ends of the base 10.

In at least one exemplary embodiment, the driving mechanism 200 of the warning device 100 can further include a standing unit 40. The standing unit 40 is connected to a lower side of a central portion of the base 10. For example, the standing unit 40 includes a standing bar 410 and a standing wheel 420, the standing wheel 420 is rotatably connected to the standing bar 410. The standing bar 410 is connected to a lower side of a central portion of the base 10, so that the standing wheel 420 and the two wheels 30 form a triangle, and the warning device 100 can be supported by the standing wheel 420 and the two wheels 30 so as to be upright when the warning device 100 is self-propelled.

A plurality of supporting units 50 are movably connected to the base 10. The plurality of driving members 60 are respectively connected to the supporting units 50.

Figure 4:
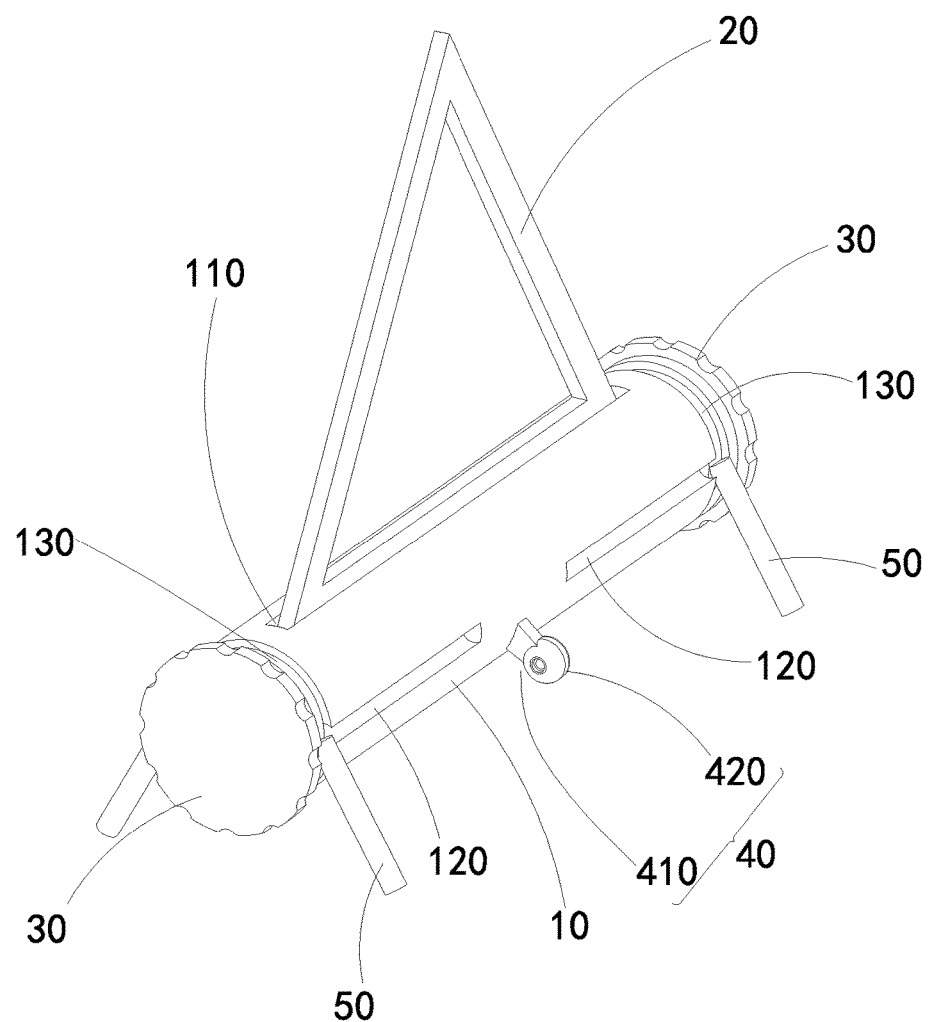
FIG. 4 is an isometric view of a supporting state of the warning device of FIG. 1.

Each of the supporting units 50 is movable between a receiving position (as shown in FIG. 1), where the supporting units 50 are received in the base 10, and a supporting position (as shown in FIG. 4), where the supporting units 50 support the driving mechanism 200 in one location. Each of the supporting units 50 is driven to move by one of the driving members 60.

Each of the supporting units 50 can include a supporting pole 501 and a connecting portion 502. An end of the supporting pole 501 is movably connected to the base 10 through the connecting portion 502.

A plurality of receiving slots 120 can be defined on side surfaces of the base 10, an end of the supporting pole 501 is movably connected to an end portion of a receiving slot 120. When the supporting unit 50 is driven by the driving members 60 to move to a receiving position, the supporting pole 501 is received in a receiving slot 120.

In at least one exemplary embodiment, a plurality of rotating slots 130 corresponding to the supporting units 50 can be defined on the base 10. The supporting pole 501 is driven by the driven members 60 to move out of the receiving slot 120 and rotate in the rotating slot 130 to the supporting position.

The base 10 can be a cylindrical case, the receiving slots 120 can be axially parallel with the cylindrical case, and the rotating slots 130 can be along a radial direction of the cylindrical case.

In at least one exemplary embodiment, when the supporting poles 501 are moved to the supporting position, the base 10 is suspended.

Figure 5:
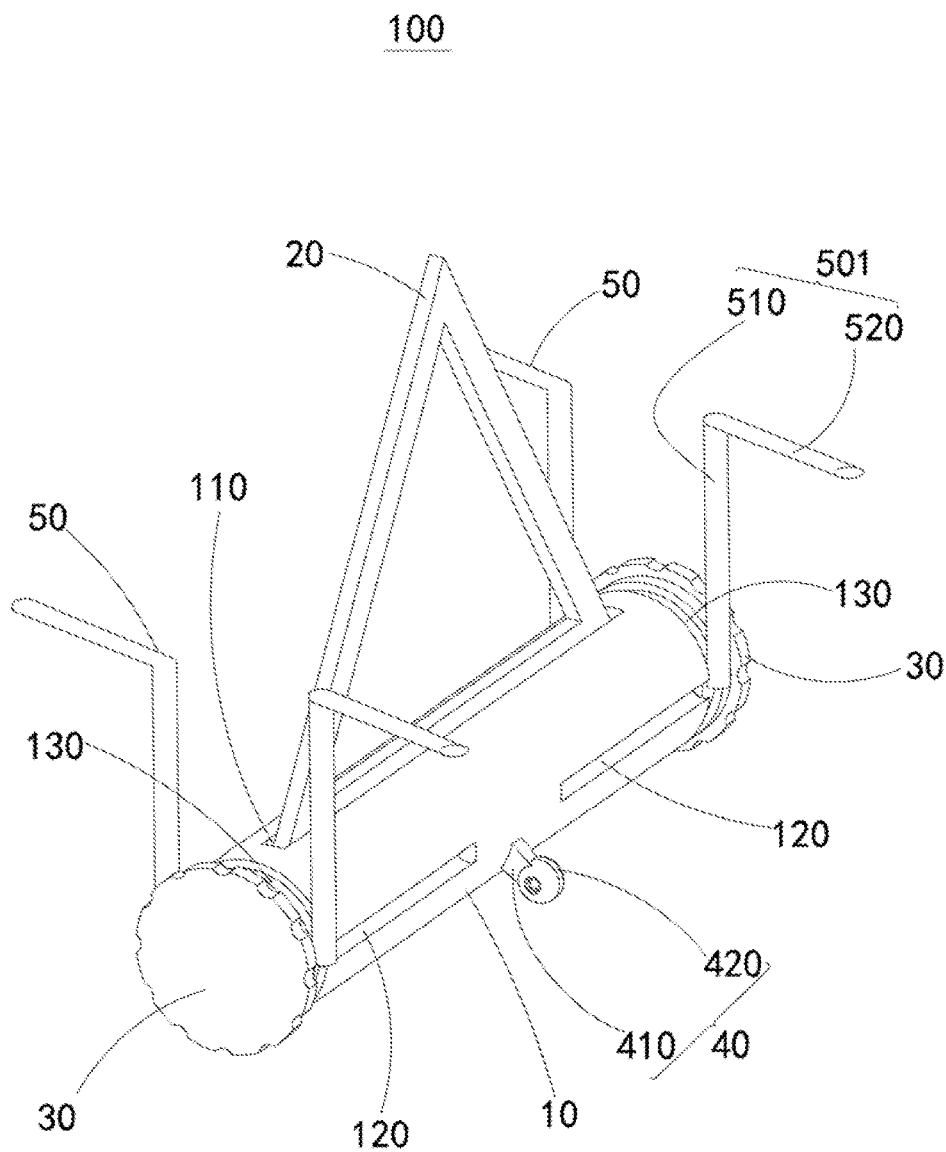
FIG. 5 is an isometric view of a second exemplary embodiment of the warning device in a mobile state.
Figure 6:
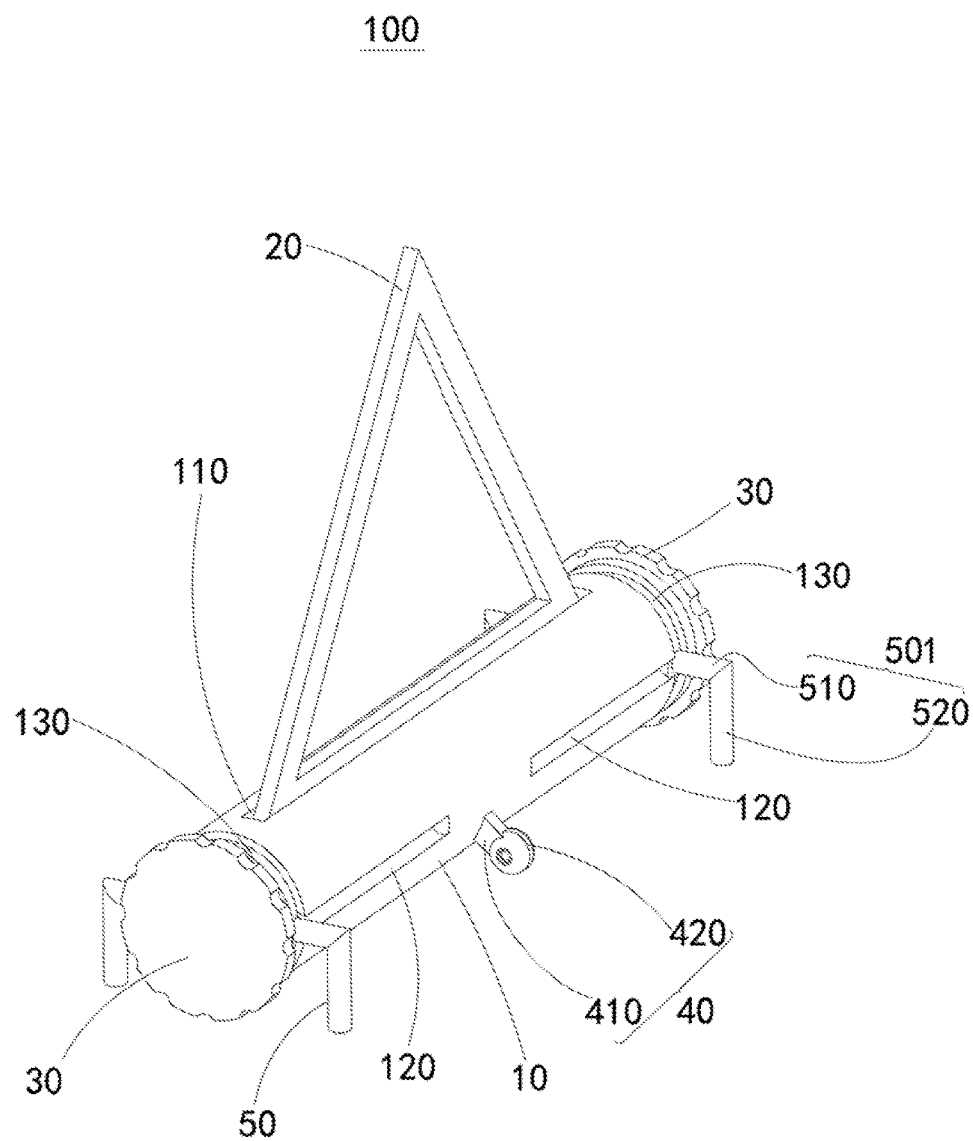
FIG. 6 is an isometric view of a supporting state of the warning device of FIG. 4.

FIGS. 5 to 6 illustrate a warning device 100 in a second exemplary embodiment. The only difference between the warning device 100 in the second exemplary embodiment and the warning device 100 in the second exemplary embodiment is in the supporting pole.

The supporting pole 501 in the second exemplary embodiment can include a first supporting rod 510 and a second supporting rod 520. The second supporting rod 520 is rotatably connected to the first supporting rod 510, so that the first supporting rod 510 and the second supporting rod 520 can be folded before being received in the receiving slot 120.

Specifically, the second supporting rod 520 is rotatable between a folding position, where the second supporting rod 520 is parallel with the first supporting rod 510, and a holding position, where the second supporting rod 520 is substantially perpendicular to the first supporting rod 510.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A driving mechanism comprising:
   a base defining an accommodating space;
   a driving unit in the accommodating space;
   at least one wheel connected to the driving unit;
   a plurality of supporting units movably connected to the base; and
   a plurality of driving members respectively connected to the supporting units;
   wherein each of the supporting units is movable between a receiving position, where the supporting units are received in the base, and a supporting position, where the supporting units support the driving mechanism by being driven by a corresponding driving member;
   each of the supporting units comprises a supporting pole;
   a plurality of receiving slots are defined on side surfaces of the base, an end of the supporting pole is movably connected to an end of a receiving slot; when the supporting unit is driven by the driving members to move to a receiving position, the supporting pole is received in a corresponding receiving slot;
   a plurality of rotating slots corresponding to the supporting units are defined on the base; the supporting pole is driven by the driven members to move out of the receiving slot and rotate in the rotating slot to the supporting position.

2. The driving mechanism of claim 1, wherein each of the supporting units further comprises a connecting portion, and an end of the supporting pole is movably connected to the base through the connecting portion.

3. The driving mechanism of claim 2, wherein the base is a cylindrical case, the receiving slots are parallel with an axial direction of the cylindrical case, the rotating slots are along a radial direction of the cylindrical case.

4. The driving mechanism of claim 2, wherein when the supporting poles are moved to the supporting position, the base is suspended.

5. The driving mechanism of claim 2, wherein the supporting pole comprises a first supporting rod and a second supporting rod rotatably connected to the first supporting rod,
   the second supporting rod is rotatable between a folding position, where the second supporting rod is parallel with the first supporting rod, and a holding position, where the second supporting rod is substantially perpendicular to the first supporting rod.

6. The driving mechanism of claim 1, wherein the driving mechanism further comprises a standing unit connected to a lower side of a central portion of the base.

7. The driving mechanism of claim 6, wherein the standing unit comprises a standing bar and a standing wheel rotatably connected to the standing bar, the standing bar is connected to a lower side of a central portion of the base.

8. A warning device comprising:
   a warning sign; and
   a driving mechanism comprising:
      a base defining an accommodating space;
      a driving unit accommodated in the accommodating space;
      at least one wheel connected to the driving unit;
      a plurality of supporting units movably connected to the base; and
      a plurality of driving members respectively connected to the supporting units;
      wherein each of the supporting units is movable between a receiving position, where the supporting units are received in the base, and a supporting position, where the supporting units support the driving mechanism by being driven by a corresponding driving member;
   each of the supporting units comprises a supporting pole;
   a plurality of receiving slots are defined on side surfaces of the base, an end of the supporting pole is movably connected to an end of a receiving slot when the supporting unit is driven by the driving members to move to a receiving position, the supporting pole is received in a corresponding receiving slot;
   a plurality of rotating slots corresponding to the supporting units are defined on the base; the supporting pole is driven by the driven members to move out of the receiving slot and rotate in the rotating slot to the supporting position;
   wherein the waning sign is installed to an upper side of the driving mechanism.

9. The warning device of claim 8, wherein each of the supporting units further comprises a connecting portion, and an end of the supporting pole is movably connected to the base through the connecting portion.

10. The warning device of claim 9, wherein the base is a cylindrical case, the receiving slots are parallel with an axial direction of the cylindrical case, the rotating slots are along a radial direction of the cylindrical case.

11. The warning device of claim 9, wherein when the supporting poles are moved to the supporting position, the base is suspended.

12. The warning device of claim 9, wherein the supporting pole comprises a first supporting rod and a second supporting rod rotatably connected to the first supporting rod,
   the second supporting rod is rotatable between a folding position, where the second supporting rod is parallel with the first supporting rod, and a holding position, where the second supporting rod is substantially perpendicular to the first supporting rod.

13. The warning device of claim 8, wherein the warning device further comprises a standing unit connected to a lower side of a central portion of the base.

14. The warning device of claim 13, wherein the standing unit comprises a standing bar and a standing wheel rotatably connected to the standing bar, the standing bar is connected to a lower side of a central portion of the base.

\* \* \* \* \*